United States Patent [19]

Langford et al.

[11] Patent Number: 4,610,155
[45] Date of Patent: Sep. 9, 1986

[54] MANUFACTURE OF ARTICLE HAVING UNDERCUT INTERNAL SURFACE

[75] Inventors: Edward A. Langford; Reginald L. Neale; Geoffrey A. Morden, all of Birmingham, England

[73] Assignee: PFD Limited, Birmingham, England

[21] Appl. No.: 611,004

[22] PCT Filed: Oct. 3, 1983

[86] PCT No.: PCT/GB83/00245
 § 371 Date: May 10, 1984
 § 102(e) Date: May 10, 1984

[87] PCT Pub. No.: WO84/01529
 PCT Pub. Date: Apr. 26, 1984

[30] Foreign Application Priority Data

Oct. 14, 1982 [GB] United Kingdom ............... 8229391

[51] Int. Cl.[4] ............................................. B21D 22/00
[52] U.S. Cl. ....................................... 72/353; 72/359
[58] Field of Search ................. 72/344, 345, 346, 353, 72/357, 360, 361

[56] References Cited

U.S. PATENT DOCUMENTS 4,406,146 9/1983 Suguli ................................. 72/353

FOREIGN PATENT DOCUMENTS 0013545 7/1980 European Pat. Off. .
49474 4/1982 European Pat. Off. .
1347448 11/1963 France .
52-24978 2/1977 Japan .
13388 2/1977 Japan .

Primary Examiner—Leon Gilden
Attorney, Agent, or Firm—Marshall, O'Toole, Gerstein, Murray & Bicknell

[57] ABSTRACT

A tool for use in manufacture of a hollow article with an undercut internal surface, such as the outer member of a constant velocity ratio universal joint, comprising first and second elements (34,38) together defining the shape required in the article interior and an internal cavity (40). An expander (23) fits in the cavity to hold the elements in their operative positions, and the first elements have parallel or outwardly convergent sides which enable their inward movement between the second elements after withdrawal of the expander from the cavity. After such inward movement, the first elements can be withdrawn from the shaped article, followed by the second elements.

8 Claims, 7 Drawing Figures

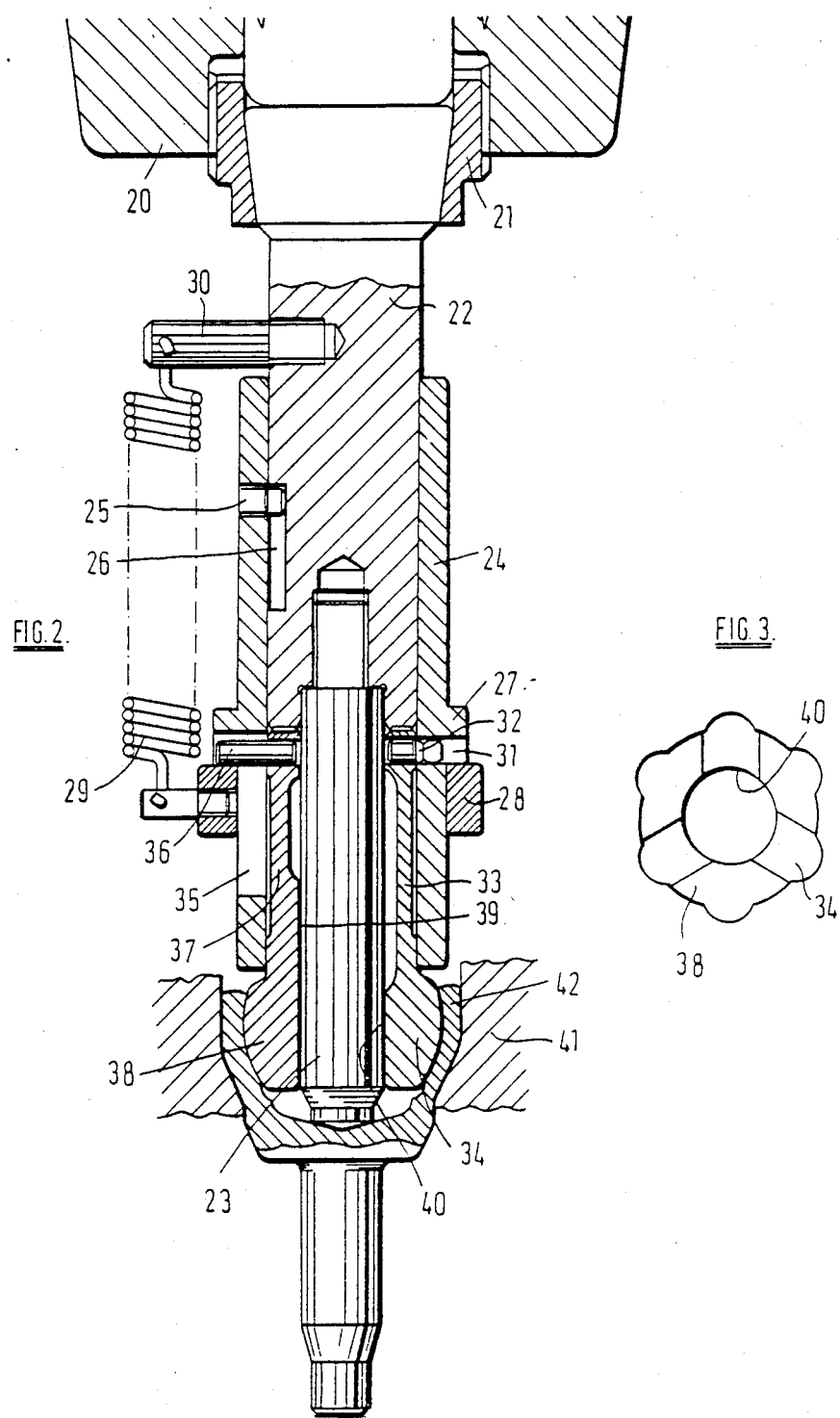

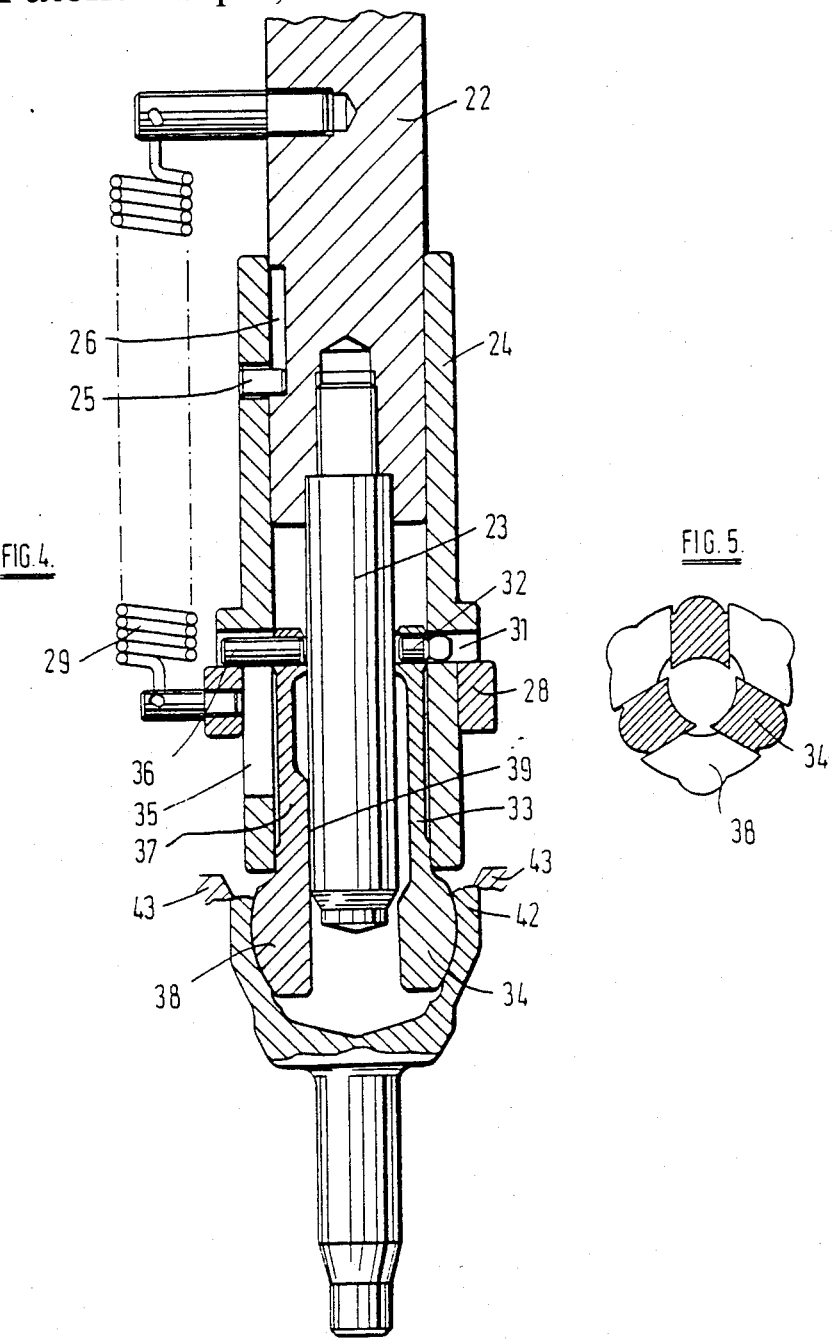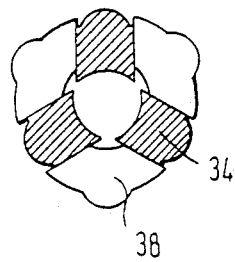

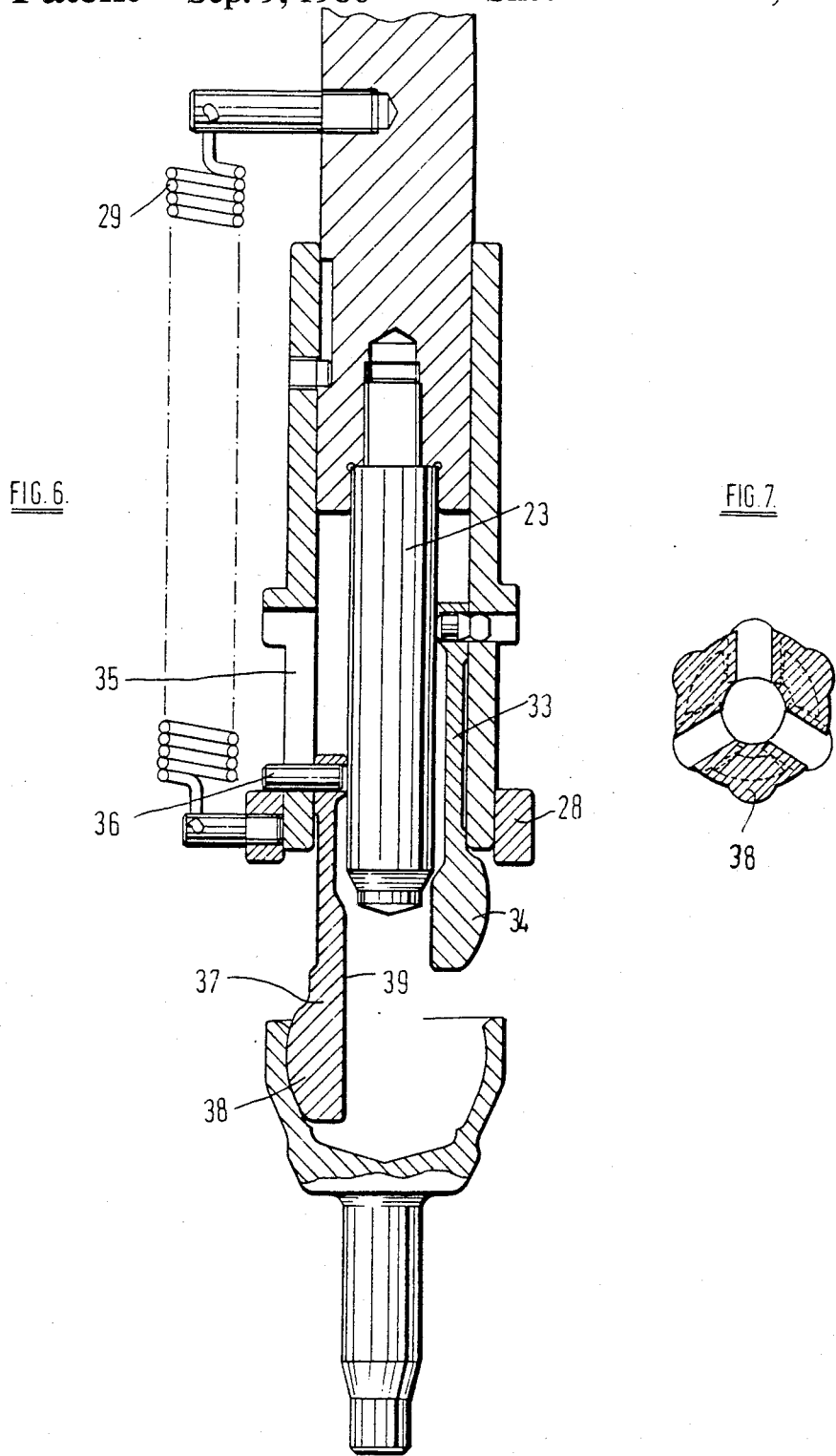

MANUFACTURE OF ARTICLE HAVING UNDERCUT INTERNAL SURFACE

This invention relates to manufacture of a hollow article having an internal surface of which at least part is undercut.

The invention is particularly applicable to the manufacture of an outer member of a constant velocity ratio universal joint, the joint comprising an outer member, having a closed end and affording an internal cavity with the internal circumferential surface thereof having axially extending grooves formed therein; an inner joint member disposed within the outer joint member and having an external surface having grooves therein which face the grooves in the outer member; a plurality of balls disposed one in each pair of grooves in the joint members for torque transmission therebetween; and a cage of annular form disposed between the joint members and having apertures in which the balls are located. The internal circumferential surface of the outer joint member between the grooves thereof is part-spherical, as is the external surface of the inner joint member, and the cage has external and internal part-spherical surfaces which engage the part-spherical surfaces of the joint members, and the shape of the grooves and/or the part-spherical surfaces of the cage and joint members is such that when the joint is articulated the balls are caused to occupy a plane which bisects the angle between the rotational axes of the joint members.

In such a universal joint, the grooves in the outer joint member may be undercut, by which we mean that the base of each groove is, at a position away from the free open end of the joint member, a greater radial distance from the rotational axis of the joint member than it is at the end of the member. The part-spherical internal surface of the outer joint member is undercut.

Because of the undercut of the part-spherical interior surface of the outer joint member, and possibly of the grooves, the joint member cannot be completely formed by a forging or extrusion process involving a forming tool inserted axially into the joint member, if the tool is in one piece. This is because a one piece forming tool cannot be withdrawn once the undercut configuration has been established. A one piece tool can be used to form the internal shape of the joint member adjacent the closed end thereof, but it is then necessary to produce the undercut shape by removal of material, usually by milling followed by a grinding process to give the required surface finish. It is also known to produce the undercut shape in a cold, warm or hot forming operation, not involving removal of material, by use of a forming tool which is made of many components and is collapsible for removal from the joint member after the undercut surfaces have been shaped. Ideally the outer joint member would then require no further treatment whatsoever, but in practice grinding is usually still required to produce the necessary surface finish.

Such collapsible forming tools as proposed hitherto have been made of a relatively large number of components. This means that the manner in which the tool collapses and is reassembled is complex, and it is difficult to ensure consistently repeatable dimensional accuracy in the assembled tool and the resulting components. Wear in use adds to these difficulties.

It has also been proposed, for example in EP 0013545A, to use a tool which has relatively few parts, but does not define an external surface corresponding to the complete internal surface of the outer joint member. Gaps exist between the parts of the tool, into which material can flow during the extrusion process. Such material then has to be removed subsequently.

It is an object of the present invention to overcome or reduce such problems.

According to one aspect of the invention, we provide a tool for use in manufacture of a hollow article having an internal surface at least part of which is undercut, said tool comprising a plurality of elements having portions together adapted to define a substantially complete external surface having a configuration corresponding to that required in said internal surface, said elements including first elements and second elements interposed between them, and the arrangement being such that said first elements can be withdrawn from said article to leave a space or spaces to permit said second elements subsequently to be moved inwardly to disengage them from said undercut internal surface part and withdrawn from said article.

By a substantially complete surface, we mean one in which there are no gaps or discontinuities sufficient for the material of the article to enter during the extrusion process, and which material would have to be removed, e.g., by machining, subsequently. By use of the tool according to the invention, the requirement for finish grinding of the internal surface of the article, including the ball grooves in a joint outer member, can be reduced or eliminated.

By providing for the first elements of the tool to be withdrawn from the article to leave space to permit the second elements of the tool subsequently to be moved inwardly and withdrawn, the tool can be designed to have relatively few component parts and yet still define the entire shape of the internal surface of the hollow article.

Preferably said elements of the tool together define an internal cavity into which an expander member is movable to hold said elements in their positions in which they define said external surface, and from which the expander member can be withdrawn to permit said first elements of the tool to be moved inwardly into said cavity prior to their withdrawal.

Inward movement of the first elements of the tool prior to their withdrawal enables both the first and second elements of the tool to have an external configuration which defines an undercut part of the internal surface of the article.

To enable the first elements of the tool to be moved inwardly after withdrawal of the expander member, the side faces of the first elements, which contact the second elements, must be parallel to one another or convergent towards the outside of the tool.

The expander member may have a tapered portion which enters said internal cavity defined by said elements of the tool, to facilitate withdrawal of the expander member after a forming operation.

The second elements of the tool may include cam surfaces which are engaged by the expander member, to hold the elements in engagement with the article, after the expander member has been at least partially withdrawn from said cavity, but which cam surfaces are dis-engaged upon further withdrawal of the expander member. This ensures that there is no hindrance to withdrawal of the first elements of the tool from the article after the expander member has been withdrawn from the cavity of the tool. However, even without such cam surfaces, the second elements of the tool will tend to remain in contact with the article after withdrawal of the expander member while the first elements of the tool are withdrawn.

The tool may comprise a holder member which holds said first elements to allow for said inward movement thereof, said holder member being mounted for movement relative to said expander member, abutment means engaging said holder member when said expander member is withdrawn from said cavity, to withdraw said first elements from said article, and further abutment means engaging said second elements after further withdrawal of said expander member and disengagement thereof from said cam surfaces, to withdraw said second elements from said article, and spring means operative between said expander member and said first and second elements to return said elements to their operative positions and said expander member to said cavity.

Further details of the tool according to the invention are described hereafter.

The invention also provides a press fitted with a tool according to the invention, and further comprising a die through which a hollow blank having the tool inside it can be pressed to form the article, and means for holding said article during withdrawal of the tool.

The invention will now be described by way of example with reference to the accompaning drawings, of which FIG. 1 is a section through a blank for making a universal joint outer member by use of the invention.

FIG. 2 is a section through a press according to the invention, in a first stage of operation.

FIG. 3 is a diagrammatic section of part of the tool of the invention, in a first stage of operation corresponding to that of FIG. 2.

Figure 1:
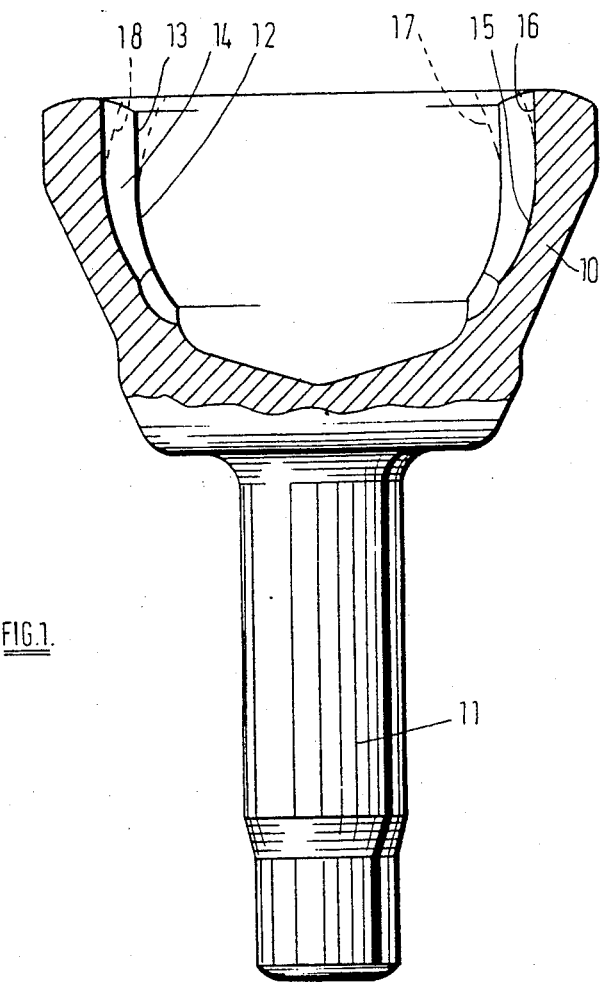

FIGS. 4 and 5 correspond to FIGS. 2 and 3, but showing a second stage of operation.

FIGS. 6 and 7 correspond to FIGS. 2 and 3, but showing a third stage of operation.

Referring firstly to FIG. 1 of the drawings, this shows a blank for use in making the outer member of a constant velocity ratio universal joint, by use of the invention. The blank comprises a hollow cup-shaped portion 10, and a spigot 11, the latter of which will ultimately be provided with splines for torque transmission with another drive line component, eg. a motor vehicle hub. The internal shape of the cup-shaped portion 10 of the blank includes a part-spherical surface portion 12 which runs into a cylindrical surface 13, and in the surfaces 12, 13 are formed axially extending circumferentially spaced grooves 14, each with an arcuate portion 15 and straight portion 16 in its base. The blank includes no undercut portions, and hence can be made by a conventional cold, warm or hot forging or back extrusion process using a one piece forming tool to give the internal shape to the blank, withdrawal of such a tool being possible because there is no undercut.

In the finished joint outer member, the shape of the internal surface of the member is as shown in broken lines at 17, ie. a continuation of the part-spherical surface 12, and the shape of the bottom of the grooves is entirely arcuate as shown in broken lines at 18. Although the undercut present in the finished joint member is exaggerated in FIG. 1, it will be appreciated that a one piece forming tool cannot be used to make the article because it cannot be withdrawn from the finished article.

Referring now to FIGS. 2 and 3 of the drawnings, there is shown a ram 20 of a press to which is secured, by a screw-threaded connection ring 21, a mandrel 22. The lower end of mandrel 22 has secured to it an elongate cylindrical expander member 23. A sleeve 24 is slidable longitudinally of mandrel 22, between limits determined by a peg 25 extending inwardly from sleeve 24 into a longitudinaly extending slot 26 in mandrel 22. Towards the lower end of sleeve 24, there is a circumferentially extending flange 27, and slidable on sleeve 24 below the flange 27 is a collar 28. The collar 28 is spring biased upwardly by a plurality of tension springs 29 spaced around the collar, only one of which springs is shown in the drawing. The springs 29 engage pins 30 extending into the mandrel 22.

Within flange 27, the sleeve 24 is provided with three equally circumferentially spaced radial apertures 31. Each aperture 31 receives a ball end of a peg 32 extending outwardly from the upper end of an element 33 having a head 34 at its lower end. Circumferentially spaced about sleeve 24, between the apertures 31, are three slots 35 which extend downwardly from flange 27. Each slot 35 receives a peg 36 extending outwardly from the upper end of an element 37 having a head 38 at its lower end. The pegs 36 are long enough to be engaged by collar 28. The head portions 34, 38 of elements 33, 37 together define an internal cavity 40 which is cylindrical and in which the expander member 23 is a close fit. The elements 37 have cam surfaces 39, extending above their parts defining the cavity 40.

The shapes of the head portions 34, 38 of elements 33, 37 are shown diagrammatically in FIG. 3 of the drawings. It will be noted that head portions 34 have parallel sides, while head portions 38 interposed therebetween are wedge shaped. The external shape of the head portions of the elements corresponds to the required internal configuration of the universal joint outer member, and thus each of the elements includes a protuberance which corresponds to one of the grooves of the finished joint member. The remainder of the exterior of the head portions of the elements 33, 37 define the part-spherical surface which is to be present in the finished joint member.

In use of the apparatus, the assembly of elements 33, 37, with the expander member 23 therein, is introduced into a blank as shown in FIG. 1. The lowermost end portions of the elements 33, 37 will fit closely within the already formed part-spherical surface 12 and grooves 14 of the blank. The press is then used to force the blank with the tool within it through a die 41. This has the effect of deforming inwardly the wall of the blank adjacent its free end, to conform to the surface shape of the assembled tool elements, as shown at 42.

The tool must then be withdrawn from the formed joint outer member, and the first stage in such withdrawal is shown in FIGS. 4 and 5.

Initially, the open end of the joint outer member is engaged by gripper members 43 to prevent its upward movement. Thereafter, mandrel 22 is raised by operation of the press. Since the elements 33, 37 cannot be withdrawn from the joint outer member because of the undercut configuration it now possesses, the sleeve 24 remains in a fixed position as the mandrel is raised, until peg 25 abuts the lower end of slot 26. During this, springs 29 have been tensioned, while the expander member, fast with mandrel 22, has been withdrawn clear of the internal cavity of the head portions of elements 33, 37.

The elements 33 are now free to tilt inwardly, so that their head portions 34 adopt the positions shown in FIG. 5. This tilting is possible by virture of the ball ends of pegs 32 engaging in apertures 31. Such tilting permits the head portions to be withdrawn from the joint outer member, with continued upward movement of mandrel 22. The head portions 38 of elements 37 at this stage, however, cannot be withdrawn because the expander member 23 remains in engagement with their cam surfaces 39 to prevent them being displaced inwardly.

On continued upward movement of mandrel 22, springs 29 are tensioned further as pegs 36 on elememts 37 move down slots 35, taking collar 28 down the sleeve 24 with them. Ultimately a position as shown in FIG. 6 is reached, in which pegs 36 have reached the lower ends of slots 35 tensioning springs 29 to their fullest extent and the expander member 23 reaching the ends of cam surfaces 39 within the elements 37. The elements 37 can then displace inwardly so that their head portions 38 reach the positions shown in FIG. 7.

The condition shown in FIG. 6 will not exist more than momentarily, since as soon as the expander member 23 is clear of cam surfaces 39 there will be a tendency for the elements 37 to move inwardly. However, as a consequence of the deformation of the material of the joint outer member, the elements 37 and indeed, elements 33 at an earlier stage, may adhere thereto so that an appreciable force needs to be exerted, by pegs 36 engaging bottoms of slots 35, before the elements 37 will remove from the joint outer member. This is why the joint outer member must be engaged by grippers 43. As soon as the elements 37 are clear of the joint outer member, springs 29 will bring collar 28 upwardly and return, firstly, the elements 37 to their starting position. Thereafter springs 29 will bring sleeve 24 along with collar 28 upwardly to its original position relative to mandrel 22, and the parts will then regain their relative positions illustrated in FIG. 2.

Because of the tendency of the head portions 38 of elements 37 to adhere to the joint outer member, the provision of cam surfaces 39 thereon to maintain them in position while elements 33 are moved inwardly and withdrawn may not be required.

Although as described the apparatus is used for the manufacture of the outer member of a constant velocity ratio universal joint, it will be appreciated that it is suitable for manufacture of other components of the same general configuration, having an internal undercut surface. There may be other numbers of elements such as elements 33, 37, according to the shape of the component to be manufactured.

In the embodiment described above, the expander member 23 is cylindrical, and the cavity defined by the head portions of elements 33, 37 of the tool also is cylindrical. In practice, the expander member and the cavity may require to be of tapering configuration, to facilitate withdrawal of the expander member after a forming operation. If during a forming operation very high forces are developed between the contacting surfaces of the expander member and the elements of tool withdrawal of the expander member is facilitated if it is tapered. Further, for the same reason, the head portions 34 of the elements 33 of the tool may require to have sides which converge outwardly, rather than being parallel.

In one form of constant velocity ratio universal joint, the grooves in the outer joint member are not undercut. The part spherical surface between the grooves is, however, still undercut. The tool can be used to make a joint of this type.

Although as described above the tool assembly is mounted on the ram of the press and the die is fixed on the base of the press, it would be possible for the die rather than the tool assembly to be moved by the press ram. The relative movements occuring between the parts of the tool assembly and the die would be the same.

We claim:

1. A tool for use in manufacture of a hollow article having an internal surface at least part of which is undercut, said tool comprising a plurality of circumferentially disposed elements, said elements having portions with surfaces together defining a substantially complete external surface having a configuration corresponding to that required in said internal surface of the article, said elements comprising a number of first elements and a number of second elements interposed between said first elements; means for withdrawing said portions of said first elements from the article to provide a space between said portions of said second elements; means permitting said portions of said second elements to be moved inwardly into said space to disengage them from said undercut internal surface part, and means for withdrawing said portions of said second elements from said article.

2. A tool according to claim 1 wherein said portions of said first and second elements together define an internal cavity, and further comprising an expander member, means for moving said expander member into said cavity to hold said portions of said elements in their positions in which they define said external surface, and means for withdrawing said expander member from said cavity to permit said portions of said first elements to be moved inwardly into said cavity prior to their withdrawal.

3. A tool according to claim 2 wherein said portions of said first elements have side faces which contact side faces of said second element portions interposed therebetween, said side faces of the first elements being parallel to one another or convergent towards the outside of the tool.

4. A tool according to claim 2 wherein said expander member has a tapered portion which enters said internal cavity defined by said portions of said tool elements.

5. A tool according to claim 2 wherein said second elements include cam surfaces engaged by said expander member to hold said portions of said second elements in engagement with said article after said expander member has been at least partially withdrawn from said internal cavity, said cam surfaces being disengaged by said expander member upon further withdrawal thereof.

6. A tool according to claim 2 further comprising a holder member holding said first elements to allow for said inward movement of said portions thereof; means mounting said holder member for movement relative to said expander member; abutment means engaging said holder member when said expander member is withdrawn from said cavity to withdraw said portions of said first elements from said article; and further abutment means engaging said second elements after further withdrawal of said expander member, to withdraw said portions of said second elements from said article.

7. A tool according to claim 6 further comprising a spring means operative between said expander member and said first and second elements, for returning said elements to operative positions and said expander member to said internal cavity.

8. A tool according to claim 1 with said external surface defined by said portions of said elements including a part-spherical portion and protuberances for forming grooves in the interior of the joint outer member.

* * * * *